(12) United States Patent
Gupta et al.

(10) Patent No.: US 11,641,508 B2
(45) Date of Patent: May 2, 2023

(54) METHODS AND SYSTEMS FOR RECOMMENDING CONTENT ITEMS

(71) Applicant: Rovi Guides, Inc., San Jose, CA (US)

(72) Inventors: Ashish Gupta, Karnataka (IN); Vaibhav Gupta, Karnataka (IN); Rohit Dhiman, Haridwar (IN); Senthil Kumar Karuppasamy, Bangalore (IN)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/116,272

(22) Filed: Dec. 9, 2020

(65) Prior Publication Data
US 2022/0182727 A1   Jun. 9, 2022

(51) Int. Cl.
| | | |
|---|---|---|
| *H04N 21/442* | (2011.01) | |
| *H04N 21/462* | (2011.01) | |
| *H04N 21/475* | (2011.01) | |
| *H04N 21/482* | (2011.01) | |
| *G06F 16/242* | (2019.01) | |
| *G06F 16/245* | (2019.01) | |
| *G06F 16/2453* | (2019.01) | |
| *G06F 16/9035* | (2019.01) | |
| *G06F 16/9038* | (2019.01) | |
| *G06F 16/435* | (2019.01) | |
| *G06F 16/2457* | (2019.01) | |

(52) U.S. Cl.
CPC ......... *H04N 21/4826* (2013.01); *G06F 16/24578* (2019.01); *G06F 16/435* (2019.01); *H04N 21/44209* (2013.01)

(58) Field of Classification Search
CPC .......... H04N 21/4826; H04N 21/4828; H04N 21/44209
See application file for complete search history.

(56) References Cited

U.S. PATENT DOCUMENTS

| | | | | |
|---|---|---|---|---|
| 2013/0275419 A1* | 10/2013 | Li | ............... | G06F 16/9535 707/723 |
| 2017/0366587 A1* | 12/2017 | Sharifi | ............... | H04N 21/4826 |
| 2018/0063591 A1* | 3/2018 | Newman | ............... | H04N 21/44 |

* cited by examiner

Primary Examiner — Hsiungfei Peng
(74) Attorney, Agent, or Firm — Haley Guiliano LLP

(57) ABSTRACT

Systems and methods are described for recommending a content item. A search query for a content item is received. The availability of the content item from more than one source is determined. In response to determining that the content item is available from more than one source, the quality of each of the available content items from respective sources is determined. A recommendation factor is determined. The recommendation factor is based on at least one of the bandwidth available to a user device, the resolution capability of the user device, and the quality of experience of each of the sources from which the content item is available. A list of search results for the available content items is generated. The list is ordered based on the quality of each of the available content items from respective sources and the recommendation factor.

20 Claims, 6 Drawing Sheets

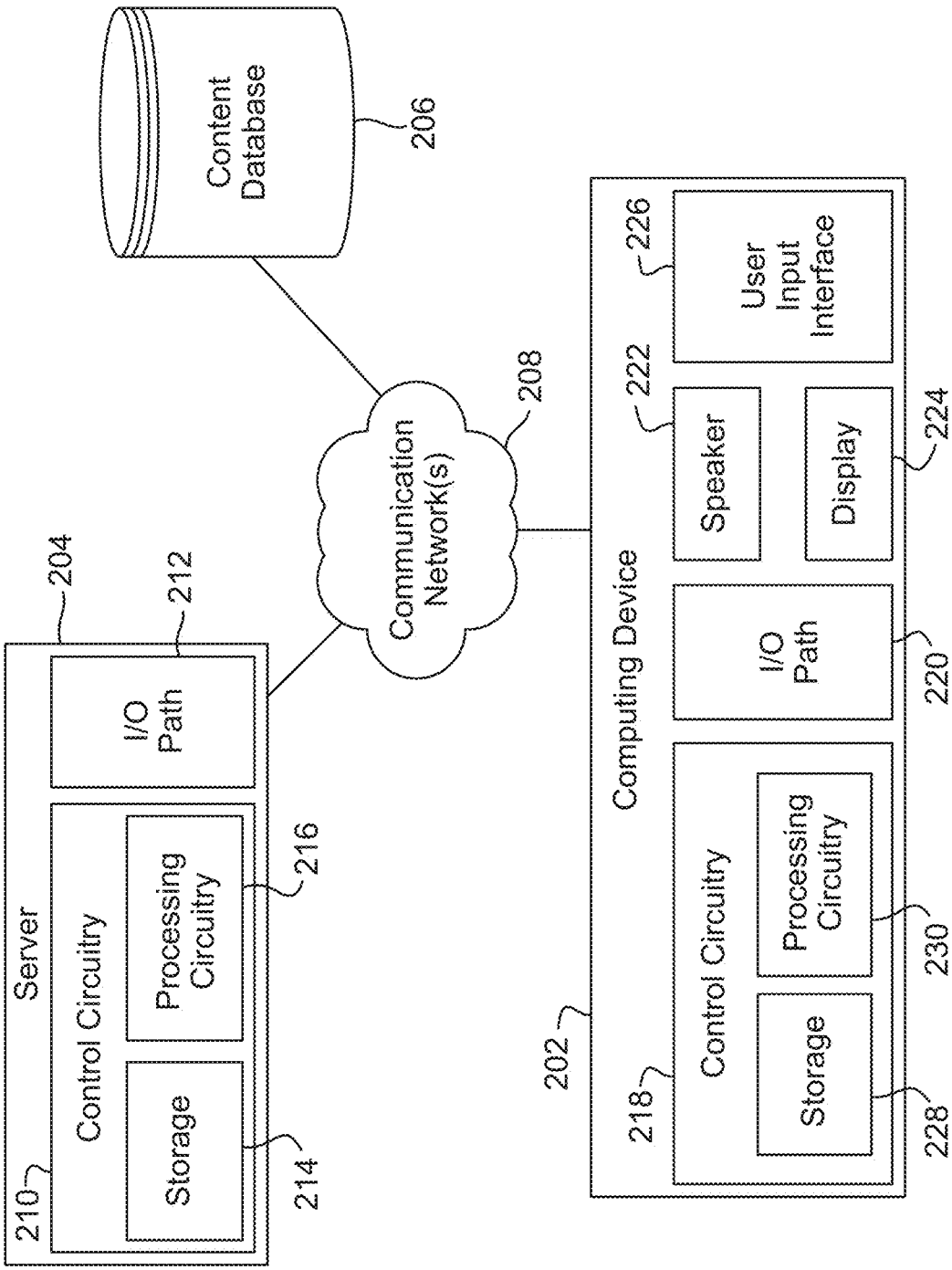

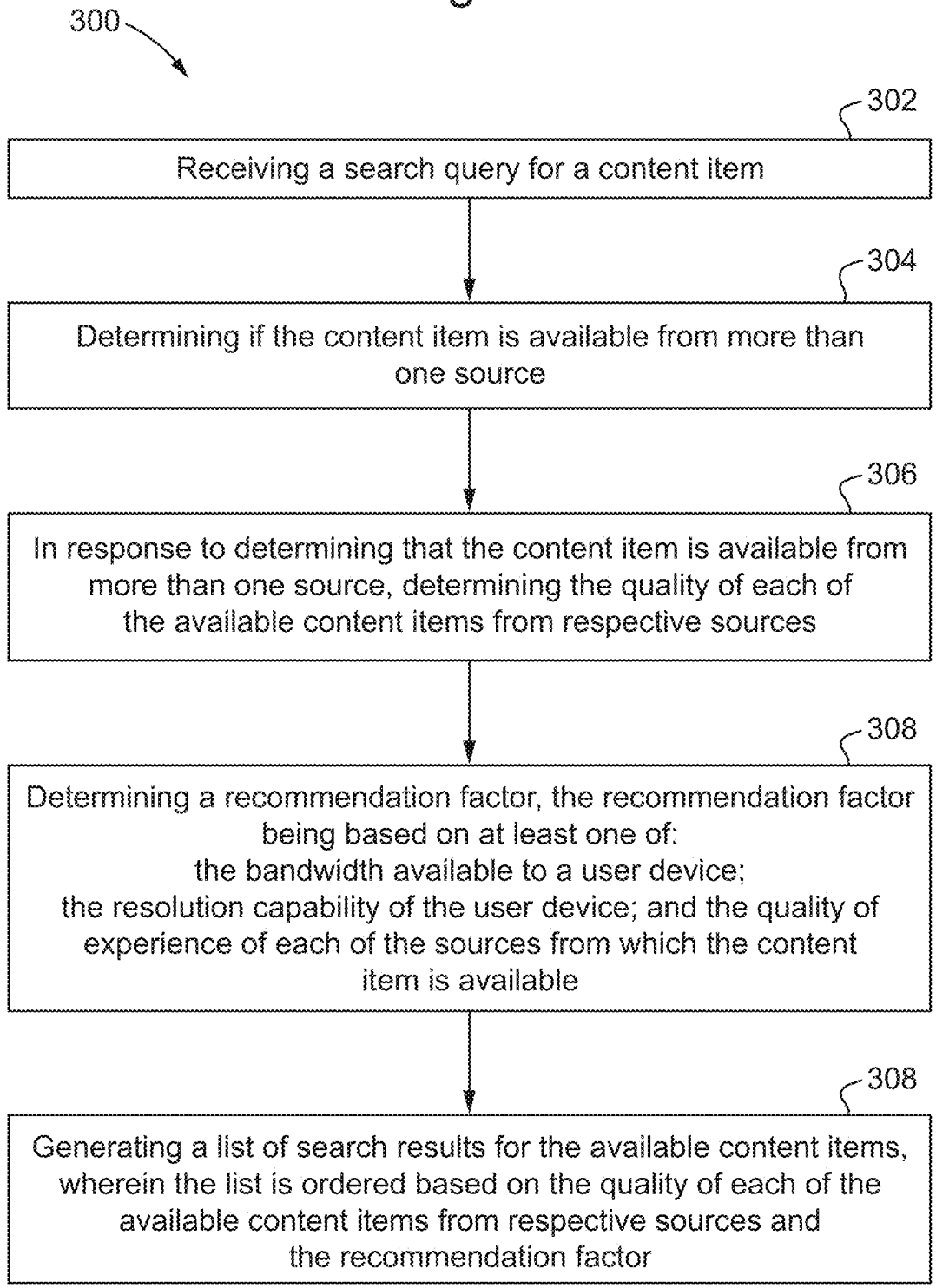

Fig. 4A

| 96.00% % Successful | 0.10% % Preflight Failure | 3.10% % Video Start Failures | 0.90% % Midstream Failures | 57.40% % Complete Transaction |
|---|---|---|---|---|
| 0.05% Video Session Fail Rate | 0.01% Video Stalling Percentage | 131,746 Total Number of Sessions | 5,314 Failed Video Sessions | 2,471.1mins Avg Session |
| 23,975 Total Number Devices | 23,975 Avg Devices Per Day | 2,232 Devices w/Failed Sessions | 4,067,301 Total Hours of Playback (duration) | 10,289,934 Total Hours of videoPlayingTime |
| | | | | 5 Avg Sessions Per Device Per Day |
| | | | | 1 Days Observed |

| Application Status | Application Error Location | Application Status Signature |
|---|---|---|
| 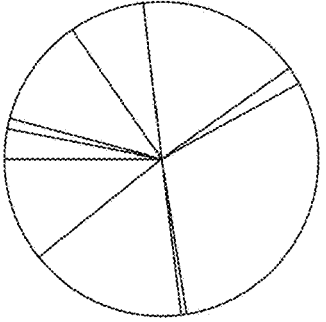 | 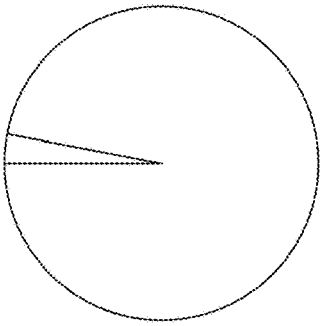 No results found | 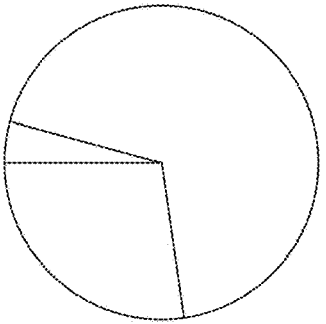 |

Streaming Sessions Statistics by t.tvc_app_name, % Successful tvc_app_name

| tvc_app_name | % Successful | % Preflight Failure | % Video Start Failures | % Midstream Failures | Fail Rate | Timeline | Stalling Percentage | Total Transactions | Total Ids (Unique Devices) |
|---|---|---|---|---|---|---|---|---|---|
| App 1 | 96.0 | 0.1 | 3.1 | 0.7 | 3.7% | ...ılll... | 0.2 | 125,589 | 21,688 |
| App 2 | 96.3 | 0.0 | 1.2 | 2.4 | 6.4% | ─.ı.─ | 0.2 | 82 | 14 |
| App 3 | 88.9 | 0.0 | 11.1 | 0.0 | 5.1% | ──l── | 0.0 | 9 | 3 |
| App 4 | 100.0 | 0.0 | 0.0 | 0.0 | 0.0% | ────── | | 1 | 1 |
| App 5 | 93.2 | 0.5 | 1.9 | 4.4 | 1.0% | ─.ıl.─ | 0.3 | 935 | 339 |
| App 6 | 94.2 | 0.4 | 1.5 | 3.9 | 9.2% | ı..ıllı.. | 0.3 | 3,828 | 1,649 |
| App 7 | 94.8 | 0.3 | 3.2 | 1.8 | 0.0% | ..ıllı.. | 0.0 | 1,136 | 257 |

| Total playingTime in hours | Total video*Time in hours | Total duration in hours | Avg Session | Avg VideoStartTime | avgVideoBitrate | avgNetworkBitrate | % Complete Transactions |
|---|---|---|---|---|---|---|---|
| 37,425 | 38,352 | 45,723 | 38 mins | 1.0 secs | 93.5 | 28.0 | 56.6 |
| 13 | 13 | 43 | 25 mins | 5.5 secs | 4.6 | 31.8 | 84.1 |
| 0 | 0 | 0 | 0 mins | 10.5 secs | 6.0 | | 33.3 |
| 0 | 0 | 0 | 0 mins | | | | 0.0 |
| 307 | 578 | 6,605 | 478 mins | 6.3 secs | 5.3 | 11.8 | 80.4 |
| 160 | 168 | 2,830 | 54 mins | 5.5 secs | 5.3 | 11.2 | 80.4 |
| 10,251,925 | 10,252,417 | 4,012,012 | 512,415 mins | 0.8 secs | 4.0 | 33.5 | 48.4 |

METHODS AND SYSTEMS FOR RECOMMENDING CONTENT ITEMS

BACKGROUND

The present disclosure relates to methods and systems for recommending content items, and in particular, but not exclusively, to generating for playback a content item based on content item quality and one or more other factors.

SUMMARY

As the amount of content available to users for consumption continues to increase, it becomes more difficult for a system to provide relevant search results and recommendations to a user. For example, with the increase in demand for over-the-top (OTT) providers in recent times, a user is faced with the same content item potentially being available from multiple content providers. In such a case, a content discovery application may be used to search for content available across different OTT providers. Conventional content discovery applications allow for the user to search for a particular content item and indicate to the user from which OTT providers the content is available. However, where the content item is available from multiple OTT providers, the user may be uncertain of which of the content items to select for viewing.

Systems and methods are provided herein for recommending to a user the highest-quality version of a content item that is available from multiple OTT providers, since it is common for a user to desire watching content items in the highest-quality possible. In some examples, the ability for the user to consume the highest-quality content available may be affected by one or more factors, such as the quality of a network to which a user device is connected, the operational capability of a user device on which the user intends to consume the content item, and the quality of experience (QoE) offered by a service provider from which the content item is available.

According to some aspects of the systems and methods provided herein, a search query for a content item is received, e.g., at a user device, such as a computer, smart TV or smartphone. In some examples, the search query may be input to a content discovery application by a user. The search query may comprise a request for a specific content item that the user wishes to consume. The availability of the content item is determined. For example, a determination is made as to whether the requested content item is available from more than one source, such as a service provider or content database. In response to determining that the content item is available from more than one source, the quality of each of the available content items from respective sources is determined. For example, it may be determined that a first version of the requested content item is available in HD from a first service provider, and a second version of the requested content item is available in SD from a second service provider. A recommendation factor is determined, e.g., in response to determining that the requested content item is available from more than one source. The recommendation factor may be based on the quality of the network connection to the user device, e.g., the bandwidth available to a user device. The recommendation factor may be based on the resolution capability of the user device, e.g., as a result of the configuration of a display control screen of the user device and/or one or more display control modules. The recommendation factor may be based on the QoE of, or provided by, each of the sources from which the content item is available. In some examples, the QoE may be a measure of the reliability of the source from which the requested content item is available. A list of search results for the available content items is generated. The list may be presented for display to the user. The list may be generated as data within a database, e.g., not output for display to a user. The order of the list is based on the quality of each of the available content items from respective sources and the recommendation factor, e.g., the list may be ranked based on the quality of each of the available content items from respective sources and the recommendation factor.

In some examples, the highest ordered content item in the list, e.g., the content item at the top if the list, may be generated for playback, e.g., automatically by the content discovery application, or upon user selection.

In some examples, the highest-quality content item available at the bandwidth available to a user device is ranked, e.g., displayed, at the top of the list. For example, the bandwidth available to the user device may limit high quality content, e.g., 4K content, from being received, or displayed properly, by the user device. As such, it may be inappropriate to rank 4K content at, or towards, the top of the list. Where it is determined that the bandwidth available to the user device is such that content of a certain quality cannot be displayed, such content may be ordered at, or towards, the bottom of the list, or in some cases, not even be included in the list of available content at all.

In some examples, the bandwidth available to the user device may be monitored, e.g., to determine a change in the available bandwidth as a result of at least one of a change in the operational parameters of the network to which the user device is connected and the location, e.g., a change of location, of the user device. In some examples, a change in network connection may be determined, e.g., a change of connection of the user device from a first network to a second network. The bandwidth available to the user device may be determined at the time of the user's request for the content item, or over a period leading up to the time of the user's request for the content item. In response to determining a change in the bandwidth available to the user device, the list may be re-ordered.

In some examples, the highest-quality content item available at the resolution capability of the user device is ranked, e.g., displayed, at the top of the list. For example, the resolution capability of the user device may limit high quality content, e.g., 4K content, from being displayed, e.g., at full resolution, by the user device. As such, it may be inappropriate to rank 4K content at, or towards, the top of the list. Where it is determined that the resolution capability of the user device is such that content of a certain quality cannot be displayed, such content may be ordered at, or towards, the bottom of the list, or in some cases, not even be included in the list of available content at all.

In some examples, the highest-quality content item available from the source having the highest ranked QoE is ranked, e.g., displayed, at, or towards, the top of the list. In some examples, the QoE of each of the sources is based on a user rating of the source. In some examples, the QoE of each of the sources is based on data relating to historic content item transmission from the respective sources. In some examples, the QoE of each of the sources is based on data relating to historic playback of content items from the respective sources on the user device.

In some examples, the recommendation factor may be weighted towards one of the bandwidth available to a user device, the resolution capability of the user device and the QoE of each of the sources from which the content item is available. For example, the recommendation factor may be based on one or more settings stored in a user profile. Such settings may indicate that the user places greater importance on receiving a higher QoE from a service provider than receiving the highest-quality content item.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 2 is a block diagram showing components of an exemplary system for providing search results for a search query based on the quality of available content items from respective sources, in accordance with some examples of the disclosure;

FIG. 3 is a flowchart representing a process for providing search results for a search query based on the quality of available content items from respective sources and a recommendation factor, in accordance with some examples of the disclosure;

FIG. 4A shows exemplary data relating to historic content item transmission of a service provider, in accordance with some examples of the disclosure; and FIG. 4B shows exemplary data relating to historic content item transmission for multiple service providers, in accordance with some examples of the disclosure.

DETAILED DESCRIPTION

Figure 1:
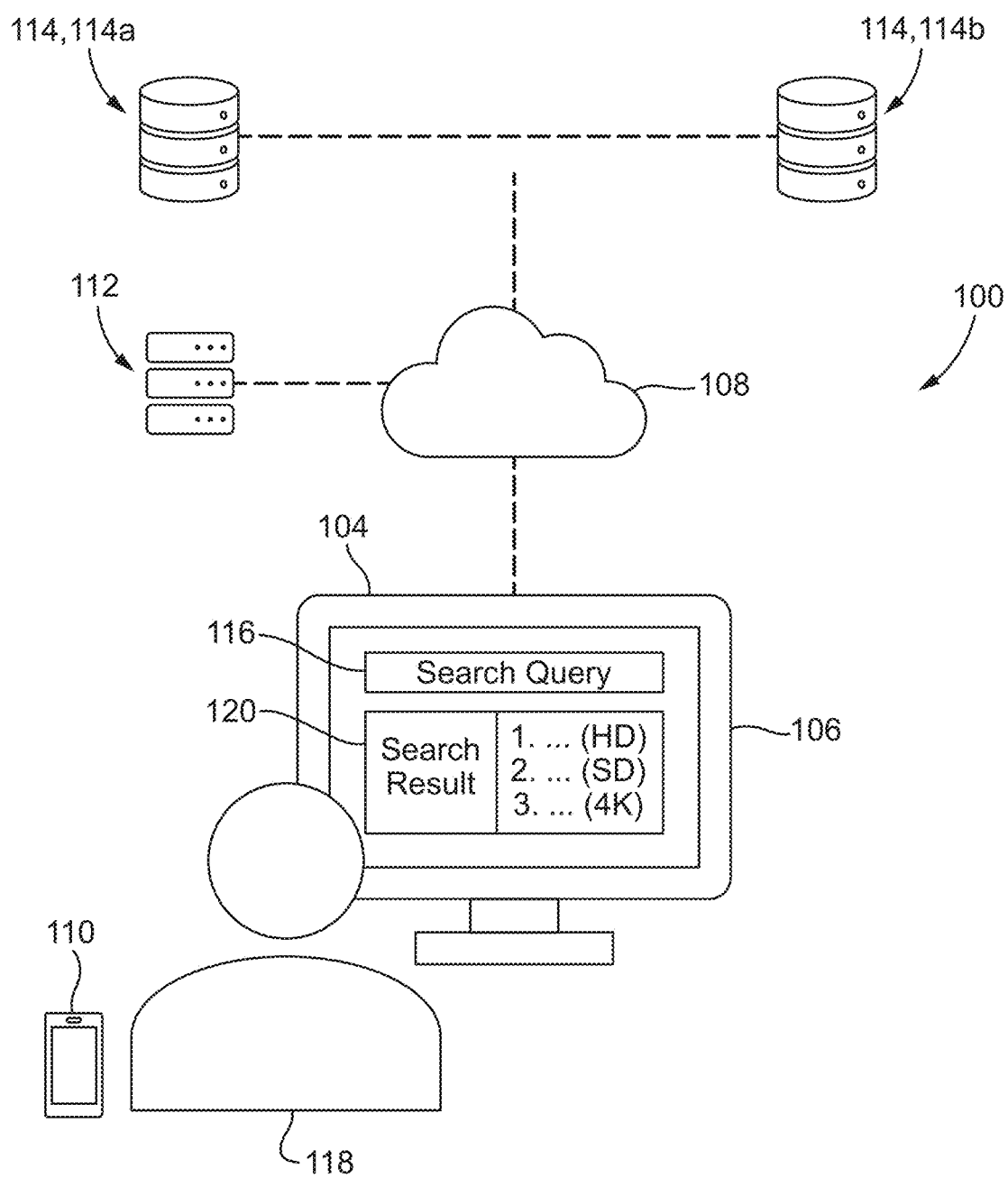
FIG. 1 illustrates an overview of a scenario in which a system provides search results for a search query based on the quality of available content items from respective sources and a recommendation factor, in accordance with some examples of the disclosure.

FIG. 1 illustrates an overview of a scenario in which a system provides search results for a search query based on the quality of an available content item from its respective source, in accordance with some examples of the disclosure. In some examples, system 100 includes a device 104, such as a tablet computer, a smartphone, a smart television, a smart speaker, or the like, that has one or more various user interfaces configured to interact with one or more nearby users 118. In some examples, device 104 has a display 106, which is configured to display information via a graphical user interface, and a user input interface, such as a keyboard and/or touchscreen configured to allow the user to input a search query into a search field displayed on the display 106. Additionally or alternatively, the device 104 may have a voice-user interface (not shown), which is configured to receive a natural language query as it is uttered by a nearby user. In some examples, device 104 has an audio driver, such as a speaker (not shown), configured to audibly provide information, such as query responses/results, to one or more users. System 100 may also include network 108, such as the Internet, configured to communicatively couple device 104 to one or more user devices 110, e.g., a mobile user device. Additionally or alternatively, device 104 may be configured to communicatively couple directly with one or more user devices 110. System 100 may also include one or more servers 112 and/or one or more content databases 114 from which information relating to the search input may be retrieved. In the example shown in FIG. 1, user device 104 is communicatively coupled to a first content database 114a (first source) and a second content database 114b (second source). Device 104 and the server 112 may be communicatively coupled to one another by way of network 108, and the server 112 may be communicatively coupled to one or more content databases 114 by way of one or more communication paths, such as a proprietary communication path and/or network 108.

In some examples, system 100 may comprise an application that provides guidance through an interface, e.g., the graphical user interface, that allows users to efficiently navigate media content selections and easily identify media content that they may desire, such as content on one or more live streams. Such guidance is referred to herein as an interactive content guidance application or, sometimes, a content guidance application, a media guidance application, or a guidance application.

Interactive media guidance applications may take various forms, depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset", "content items" and "content" should each be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, chat sessions, social media, applications, games, and/or any other media or multimedia and/or combination of the same. Guidance applications also allow users to navigate amid and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the examples discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media card, register memory, processor cache, random access memory (RAM), etc.

With the ever-improving capabilities of the Internet, mobile computing, and high-speed wireless networks, users are accessing media on user equipment devices on which they traditionally did not. As referred to herein, the phrases "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smartphone, or any other television equipment, computing equipment, or wireless device, and/or combination of the same. In some examples, the user equipment device may have a front-facing screen and a rear-facing screen, multiple front screens, or multiple angled screens. In some examples, the user equipment device may have a front-facing camera and/or a rear-facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available through both a television and one or more of the other types of user equipment devices. The media guidance applications may be provided as online applications (i.e., provided on a website), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critics' ratings, etc.), genre or category information, actor information, logo data for broadcasters' or providers' logos, etc.), media format (e.g., standard definition, high definition, 3D, etc.), on-demand information, blogs, websites, and any other type of guidance data that is helpful for a user to navigate among and locate desired content selections.

FIG. 2 is an illustrative block diagram showing additional details of an example of system 200 for providing search results based on the proximity and/or relationship between one or more users, in accordance with some examples of the disclosure. Although FIG. 2 shows system 200 as including a number and configuration of individual components, in some examples, any number of the components of system 200 may be combined and/or integrated as one device, e.g., user device 100. System 200 includes computing device 202, server 204, and content database 206, each of which is communicatively coupled to communication network 208, which may be the Internet or any other suitable network or group of networks. In some examples, system 200 excludes server 204, and functionality that would otherwise be implemented by server 204 is instead implemented by other components of system 200, such as computing device 202. In still other examples, server 204 works in conjunction with computing device 202 to implement certain functionality described herein in a distributed or cooperative manner.

Server 204 includes control circuitry 210 and input/output (hereinafter "I/O") path 212, and control circuitry 210 includes storage 214 and processing circuitry 216. Computing device 202, which may be a personal computer, a laptop computer, a tablet computer, a smartphone, a smart television, a smart speaker, or any other type of computing device, includes control circuitry 218, I/O path 220, speaker 222, display 224, e.g., touchscreen 102, and user input interface 226, which in some examples includes at least one of voice-user interface configured to receive natural language queries uttered by users in proximity to computing device 202; and a touch/gesture interface configured to receive a touch/gesture input, e.g., a swipe. Control circuitry 218 includes storage 228 and processing circuitry 230. Control circuitry 210 and/or 218 may be based on any suitable processing circuitry such as processing circuitry 216 and/or 230. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some examples, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 214, storage 228, and/or storages of other components of system 200 (e.g., storages of content database 206, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 214, storage 228, and/or storages of other components of system 200 may be used to store various types of content, metadata, and or other types of data. Non-volatile memory may also be used (e.g., to launch a boot-up routine and other instructions). Cloud-based storage may be used to supplement storages 214, 228 or instead of storages 214, 228. In some examples, control circuitry 210 and/or 218 executes instructions for an application stored in memory (e.g., storage 214 and/or 228). Specifically, control circuitry 214 and/or 228 may be instructed by the application to perform the functions discussed herein. In some implementations, any action performed by control circuitry 214 and/or 228 may be based on instructions received from the application. For example, the application may be implemented as software or a set of executable instructions that may be stored in storage 214 and/or 228 and executed by control circuitry 214 and/or 228. In some examples, the application may be a client/server application where only a client application resides on computing device 202, and a server application resides on server 204.

The application may be implemented using any suitable architecture. For example, it may be a stand-alone application wholly implemented on computing device 202. In such an approach, instructions for the application are stored locally (e.g., in storage 228), and data for use by the application is downloaded on a periodic basis (e.g., from an out-of-band feed, from an Internet resource, or using another suitable approach). Control circuitry 218 may retrieve instructions for the application from storage 228 and process the instructions to perform the functionality described herein. Based on the processed instructions, control circuitry 218 may determine what action to perform when input is received from user input interface 226.

In client/server-based examples, control circuitry 218 may include communication circuitry suitable for communicating with an application server (e.g., server 204) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 208). In another example of a client/server-based application, control circuitry 218 runs a web browser that interprets web pages provided by a remote server (e.g., server 204). For example, the remote server may store the instructions for the application in a storage device. The remote server may process the stored instructions using circuitry (e.g., control circuitry 210) and/or generate displays. Computing device 202 may receive the displays generated by the remote server and may display the content of the displays locally via display 224. This way, the processing of the instructions is performed remotely (e.g., by server 204) while the resulting displays, such as the display windows described elsewhere herein, are provided locally on computing device 202. Computing device 202 may receive inputs from the user via input interface 226 and transmit those inputs to the remote server for processing and generating the corresponding displays.

A user may send instructions to control circuitry 210 and/or 218 using user input interface 226. User input interface 226 may be any suitable user interface, such as a remote control, trackball, keypad, keyboard, touchscreen, touchpad, stylus input, joystick, voice recognition interface, gaming controller, or other user input interfaces. User input interface 226 may be integrated with or combined with display 224, which may be a monitor, a television, a liquid crystal display (LCD), an electronic ink display, or any other equipment suitable for displaying visual images.

Server 204 and computing device 202 may transmit and receive content and data via I/O path 212 and 220, respectively. For instance, I/O path 212 and/or I/O path 220 may include a communication port(s) configured to transmit and/or receive (for instance to and/or from content database 206), via communication network 208, content item identifiers, content metadata, natural language queries, and/or other data. Control circuitry 210, 218 may be used to send and receive commands, requests, and other suitable data using I/O paths 212, 220.

FIG. 3 is a flowchart representing an illustrative process 300 for providing search results to a user's query based on the quality of a content item available from multiple sources and a recommendation factor, in accordance with some examples of the disclosure. While the example shown in FIG. 3 refers to the use of system 100, as shown in FIG. 1, it will be appreciated that the illustrative process shown in FIG. 3, and any of the other following illustrative processes, may be implemented on system 100 and system 200, either alone or in combination, or on any other appropriately configured system architecture.

At step 302, user device 104 receives, e.g., at a content guidance application, a search query input 116 from a user 118. In some examples, the user 118 may enter the search query input 116 directly into the device 104, e.g., using a user input interface of the device 104. Additionally or alternatively, the user 118 may enter the search query input 116 into personal device 110, such as a smartphone, of the user 118, from which the search query input 116 is sent to device 104 for processing. For example, the user 118 may enter the search query Mission: Impossible—Fallout into a content discovery application. The intent of the user is to find one or more sources, e.g., service providers and/or content databases, allowing access to the content item Mission: Impossible—Fallout.

At step 304, control circuitry, e.g., of user device 104, determines if the content item is available from more than one source. For example, a content discovery application installed on user device 104 may be configured to retrieve data from a content listing of respective service providers to determine if the content item requested by the user 118 is available from multiple service providers, such as Netflix®, Amazon Prime®, Disney+® and iTunes®. Using FIG. 1 as an example, control circuitry may determine that a first version of the content item requested by the user 118 is available from the first content database 114a, which may be a Netflix content database, and that a second version of the content item requested by the user 118 is available from the second content database 114b, which may be an Amazon Prime content database.

At step 306, in response to determining that the content item is available from more than one source, control circuitry, e.g., of user device 104, determines the quality of each of the available content items from its respective source. For example, notwithstanding licensing restrictions, the content discovery application may determine that Mission: Impossible—Fallout is available from each of Netflix, Amazon Prime and Disney+, but not iTunes. A conventional content discovery application may return the same, or similar, results, but display the results to the user in no particular order. It is desirable, therefore, for the content discovery application to order the results in a manner that may aid the user in selecting the most suitable content item to select for playback.

In some examples, the content discovery application may retrieve metadata associated with each of the content items available from the respective service providers indicating the quality of each of the content items. For example, the content discovery application may determine that Mission: Impossible—Fallout is available from Netflix in 4K quality, from Amazon Prime in HD quality and from Disney+ in SD quality. The content discovery application may, in the first instance, rank the available content items according to their quality. For example, the content discovery application may list the available content items in descending quality, e.g., 4K, HD, SD, etc.

At step 308, control circuitry, e.g., of user device 104, determines a recommendation factor, the recommendation factor being based on at least one of the bandwidth available to a user device; the resolution capability of the user device; and the QoE of each of the sources from which the content item is available.

In some examples, control circuitry, e.g., of user device 104, determines the bandwidth available to user device 104. For example, control circuitry may monitor the connection between user device 104 and network 108, e.g., to determine the quality of the connection based on the speed of connection and/or the reliability of connection. In some examples, the quality of the connection may vary over time and/or location. However, control circuitry may determine the bandwidth available to the user device, e.g., at the time, in the lead-up to the time, and/or at the location at which the search query input 116 was received. For example, control circuitry may determine that the bandwidth available to the user device 104 is a certain value, e.g., 15.8 Mbit/s, at the time at which the search query input 116 was received, or averaged a certain value, e.g., 12.6 Mbit/s, over a predetermined period, e.g., one hour, in the lead0-up to the time that search input query was received.

In some examples, process 300 comprises a step of determining if the quality of the user device 104 connection to network 108 is sufficient to stream each of the available content items from the respective sources. For example, control circuitry of the user device 104 may compare the bit rate required to stream a content item of a certain quality to the determined quality of the connection between the user device 104 and the service provider. For example, control circuitry may access a lookup table to retrieve the bit rate required to adequately stream 4K content (or any other content quality), e.g., at full resolution.

In some examples, control circuitry, e.g., of user device 104, determines the resolution capability of the user device 104. For example, control circuitry may determine the resolution capability of a display screen of the user device 104, e.g., the maximum resolution capability of the display screen. Additionally or alternatively, control circuitry may determine one or more operational capabilities of a control module of the display screen. For example, control circuitry may determine the capabilities of a graphics processing unit, a processor clock speed, the amount of graphics memory available, and/or any other appropriate operational parameter of the user device 104 that may affect the ability of the user device 104 to display an image. For example, control circuitry may determine that the user device 104 is capable of displaying a maximum resolution of 1080p.

In some examples, control circuitry, e.g., of user device 104, determines the QoE of each of the sources from which the content item is available. For example, control circuitry may be configured to access data, e.g., stored on server 112, relating to one or more service providers. For example, control circuitry may be configured to access user feedback data for each of the service providers. User feedback data may be based on one or more appropriate rating categories. For example, it is common for users to submit their feedback to service providers relating to various categories, such as content quality, user interface experience, error rates, bit rate, throughput, transmission delay, availability, jitter, trick play experience, etc. For example, a service provider may receive a rating of 3.5 stars out of 5 stars for the quality of content, a rating of 2.5 stars out of 5 stars for the user interface experience, and a rating of 4.5 stars out of 5 stars for the trick play experience. In such a case, the service provider may receive a total overall rating of 3.5 stars out of 5, e.g., 70%. Additionally or alternatively, a rating may be determined from one or more other independent sources. As such, control circuitry of the user device may be able to determine a QoE for each service provider based on, e.g., based only on, data relating to user feedback for respective service providers.

Additionally or alternatively, control circuitry may be configured to access data recorded on user device 104 relating to historic playback of content items from at least one of the sources. For example, control circuitry, e.g., of user device 104, may be configured to log one or more playback parameters when receiving content from a service provider, e.g., first service provider 114a and/or second service provider 114b. FIG. 4A shows exemplary data relating to historic playback at a user device of content items from a service provider, which may include parameters such as pre-flight failure, video start failures, midstream failures, complete transactions, video session fail rate, video stalling percentage, total number of sessions, failed video sessions, average session duration, average sessions per day, number of failed sessions, total hours of playback. Such parameters may be recorded directly at user device 104, and, as such, control circuitry of the user device may be able to determine a QoE for each service provider based on, e.g., based only on, data recorded at the user device relating to historic playback of content items from respective service providers. For example, control circuitry may be configured to determine a percentage success value 402 for the playback of content items from respective service providers, e.g., based on at least one of the above parameters. In some examples, the QoE may be based at least partially on percentage success value 402. Additionally or alternatively, control circuitry may be configured to receive data relating to historic playback of content items from at least one other user device. In this manner, control circuitry may be able to determine a QoE of each of the sources based on, e.g., based only on, data recorded at one or more other user devices relating to historic playback of content items from respective service providers.

Additionally or alternatively, control circuitry, e.g., of user device 104, may be configured to receive data from server 112 relating to historic content item transmission from the respective sources. For example, each of the service providers may log parameters relating to the transmission of content. FIG. 4B shows exemplary data relating to historic transmission of content items by multiple service providers. Such parameters may include pre-flight failure, video start failures, midstream failures, complete transactions, video session fail rate, video stalling percentage, total number of sessions, failed video sessions, average session duration, average sessions per day, number of failed sessions, total hours of playback, total number of devices, average devices per day, number of devices with failed sessions and total hours of playback, and percentage complete transactions. Such parameters may be recorded over an appropriate period, e.g., one day or several days. Such parameters may be transmitted to user device 104, and, as such, control circuitry of the user device may be able to determine a QoE for each service provider based on, e.g., only on, data recorded by the service provider relating to historic transmission of content items from said service provider to user device 104. For example, control circuitry may be configured to determine a percentage fail value 404 for the transmission of content from respective service providers, e.g., based on at least one of the above parameters. In some examples, the QoE for a service provider may be based at least partially on percentage fail value 404.

In view of the above, it is understood that the recommendation factor may be based on at least one of the quality of the network connection to the user device, the resolution capability of a screen of the user device and a QoE score based on user ratings, parameters relating to historic content item playback and/or parameters relating to historic content item transmission. In some examples, process 300 may apply a weighting k to at least one of the above optional variables on which the recommendation factor is based. For example, a weighting may be applied based on one or more user preferences, e.g., for highest user-rated service providers. In some examples, the weighting applied to a variable on which the recommendation factor is based may be zero, in which case means that it does not directly form part of the determination of the recommendation factor. As such, the recommendation factor (RF) may be determined using the formula:

$$RF = f(k1 \cdot bandwidth, k2 \cdot resolution, k3 \cdot QoE)$$

At step 310, control circuitry generates a list of search results for the available content items, wherein the list is ordered based on the quality of each of the available content items from respective sources and the recommendation factor. FIG. 1 shows a list of search results 120 for the content item Mission: Impossible—Fallout ranked based on the quality of each of the available content items from respective sources and the recommendation factor. For example, the list 120 is generated displaying an HD content item at position 1 of the list, an SD content item at position 2 of the list and a 4K content item at position 3 of the list. Such an order may be the result of at least one of i) the bandwidth available to user device 104 not being sufficient to stream the 4K content item; ii) the screen of user device 104 not being capable of displaying the 4K content item; and iii) the source of the 4K content item having a lower QoE score than each of the sources for the HD content item and the SD content item.

Process 300 may comprise a step of automatically generating for playback the content item presented in position #1 of the list. In some examples, list 120 may not be displayed to user 118. In such cases, list 120 may exist in a database accessible by control circuitry of user device 104, so that the highest-ranked content item may be displayed automatically, e.g., without any further input from the user.

In some examples, process 300 may comprise determining a change in the recommendation factor as a function of time. For example, control circuitry, e.g., of user device 104, may determine a change in the bandwidth available to user device 104, e.g., as a content item is being streamed to user device 104. For example, where user device 104 is connected to a home network, control circuitry may determine at least one of a drop in the speed of the network connection being received by the home hub and/or an increase in the number of devices connected to the home hub. As a result, the recommendation factor may change for a given content item. For example, where a 4K content item had previously been ranked in position 1 owing to a large amount of available bandwidth, said 4K content item may be re-ranked to a lower position, e.g., position 3, as a result of the network connection no longer being able to support the streaming of 4K content. Such dynamic re-ranking may result in the automatic switching of the display of content from the 4K content item to a content item having lower quality, e.g., by virtue of the re-ordering of the list.

The actions or descriptions of FIG. 3 may be used with any other example of this disclosure. In addition, the actions and descriptions described in relation to FIG. 3 may be done in any suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one example may be applied to any other example herein, and flowcharts or examples relating to one example may be combined with any other example in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A content item recommendation method comprising:
receiving a search query for a content item;
determining if the content item is available from more than one source;
in response to determining that the content item is available from more than one source:
   determining a maximum resolution supported by a user device;
   retrieving metadata associated with each of the content items;
   determining, based on the metadata, the quality of each of the available content items from respective sources;
   accessing user feedback for each of the sources; and
   determining, based on the user feedback, a quality of experience for each of the sources;
determining a recommendation factor, the recommendation factor being based on whether the resolution of a content item is greater than the maximum resolution supported by the user device, the bandwidth available to the user device, the resolution capability of the user device and the quality of experience of each of the sources from which the content item is available; and
generating a list of search results for the available content items, wherein the list is ordered based on the quality of each of the available content items from respective sources and the recommendation factor.

2. The method of claim 1, wherein the highest-quality content item available at the bandwidth available to a user device is ranked at the top of the list.

3. The method of claim 1, wherein the highest-quality content item available at the resolution capability of the user device is ranked at the top of the list.

4. The method of claim 1, wherein the highest-quality content item available from the source having the highest-ranked quality of experience is ranked at the top of the list.

5. The method of claim 1, wherein the quality of experience of each of the sources is based on data relating to historic content item transmission from the respective sources.

6. The method of claim 1, wherein the quality of experience of each of the sources is based on data relating to historic playback of content items from the respective sources at the user device.

7. The method of claim 1, wherein determining the recommendation factor further comprises applying weightings, based on user preferences, towards the bandwidth available to a user device, the resolution capability of the user device and the quality of experience of each of the sources from which the content item is available.

8. The method of claim 1, the method comprising monitoring the bandwidth available to the user device, and, in response to determining a change in the bandwidth available to the user device, re-ordering the list.

9. The method of claim 1, the method comprising automatically generating for playback the highest ordered content item in the list.

10. The method of claim 1, the method further comprising:
- generating for output the a first content item in the list at a first resolution;
- monitoring the bandwidth available to the user device, and, in response to determining a change in the bandwidth available to the user device:
  - re-ordering the list; and
  - generating for output the first content item at a second resolution.

11. A system for recommendation of a content item, the system comprising:
- control circuitry configured to:
  - receive a search query for a content item;
  - determine if the content item is available from more than one source;
  - in response to determining that the content item is available from more than one source:
    - determine a maximum resolution supported by a user device;
    - retrieve metadata associated with each of the content items;
    - determine, based on the metadata, the quality of each of the available content items from respective sources;
    - access user feedback for each of the sources; and
    - determine, based on the user feedback, a quality of experience for each of the sources;
  - determine a recommendation factor, the recommendation factor being based on whether the resolution of a content item is greater than the maximum resolution supported by the user device, the bandwidth available to the user device, the resolution capability of the user device and the quality of experience of each of the sources from which the content item is available; and
  - generate a list of search results for the available content items, wherein the list is ordered based on the quality of each of the available content items from respective sources and the recommendation factor.

12. The system of claim 11, wherein the highest-quality content item available at the bandwidth available to a user device is ranked at the top of the list.

13. The system of claim 11, wherein the highest-quality content item available at the resolution capability of the user device is ranked at the top of the list.

14. The system of claim 11, wherein the highest-quality content item available from the source having the highest-ranked quality of experience is ranked at the top of the list.

15. The system of claim 11, wherein the quality of experience of each of the sources is based on data relating to historic content item transmission from the respective sources.

16. The system of claim 11, wherein the quality of experience of each of the sources is based on data relating to historic playback of content items from the respective sources at the user device.

17. The system of claim 11, wherein the control circuitry configured to determine the recommendation factor is further configured to apply weightings, based on user preferences, towards the bandwidth available to a user device, the resolution capability of the user device and the quality of experience of each of the sources from which the content item is available.

18. The system of claim 11, wherein the control circuitry is configured to monitor the bandwidth available to the user device, and, in response to determining a change in the bandwidth available to the user device, re-order the list.

19. The system of claim 11, wherein the control circuitry is configured to automatically generating for playback the highest-ordered content item in the list.

20. The system of claim 11, the system further comprising control circuitry configured to:
- generate for output the a first content item in the list at a first resolution;
- monitor the bandwidth available to the user device, and, in response to determining a change in the bandwidth available to the user device:
  - re-order the list; and
  - generate for output the first content item at a second resolution.

* * * * *